Sept. 2, 1969     G. F. KILTHAU     3,464,798
ION-EXCHANGE OR CHEMICAL INTERACTION PLASTIC FORM
Filed Nov. 16, 1965
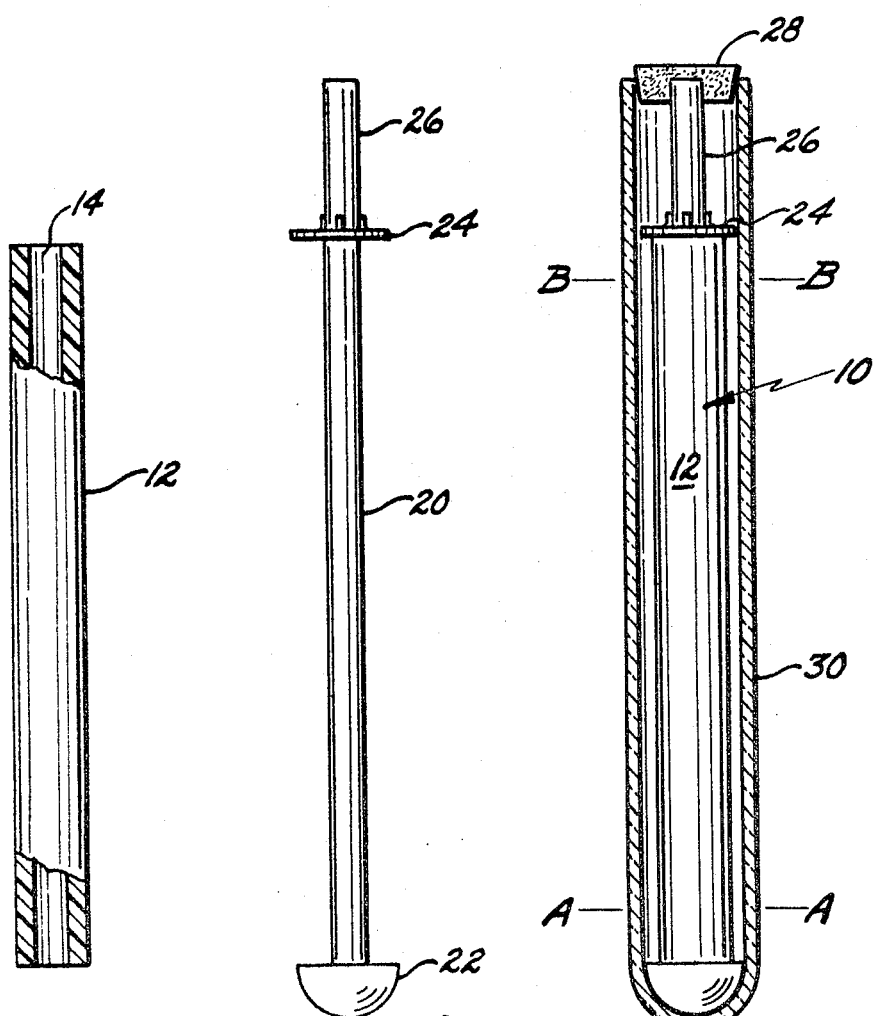
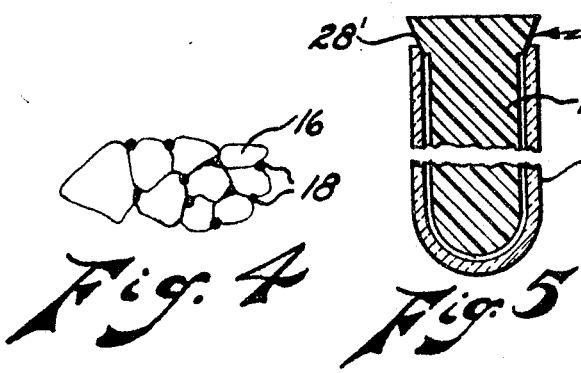
INVENTOR.
GUSTAVE FREDERICK KILTHAU
BY Harry A. Herbert Jr.
Sherman H. Silman and
ATTORNEY.

United States Patent Office 3,464,798
Patented Sept. 2, 1969

3,464,798
ION-EXCHANGE OR CHEMICAL INTERACTION
PLASTIC FORM
Gustave Frederick Kilthau, 3250 Lasses Blvd.,
San Antonio, Tex. 78223
Filed Nov. 16, 1965, Ser. No. 508,174
Int. Cl. G01n 31/04
U.S. Cl. 23—253                                5 Claims

ABSTRACT OF THE DISCLOSURE

A nonabsorbent, molded, cellular ion-exchanger or chemical reaction member proportioned with respect to a container to displace a small amount of liquid in said container around the member to accelerate ion-exchange or chemical interaction.

---

The invention described herein may be manufactured and used by or for the United States Government for governmental purposes without payment to me of any royalty thereon.

This invention relates generally to nonabsorbent, molded, cellular ion-exchange or chemical reaction members and, more particularly, to one of a particular shape which is proportioned for displacing a small amount of liquid in a container to force the liquid to rise and form a thin layer of fluid around the member to accelerate ion-exchange or chemical interaction.

It has been proposed to utilize ion-exchange resins in plastic tubes or sheets; however, no particular shape which would correspond to and which would be proportioned with respect to that of a container has been proposed which would enable the acceleration of reaction by virtue of providing for an increased surface area presentment of a fluid to be tested with ion-exchange or chemical interaction media. Another mode used with chemical testing generally involves chemicals or ion-exchange material being mixed with a fluid to be tested in order to produce the desired action or reaction between the mixture.

This invention contemplates the utilization of particular shapes of a foam containing a desired quantity of ion-exchange resin or an active chemical substance to be used in conjunction with a container such that the resultant surface area of reaction interfaces is increased. The combination of form and container of this invention is found to have many advantages over the prior art. These involve the elimination of loose chemicals or ion-exchange resins with the attendant disadvantages of having a weighing requirement and the possibility of contamination when this mode is utilized in test procedures. In addition, the amount of time for ion-exchange or chemical interaction is accelerated. Furthermore, the extension of the surface area of reaction interfaces also aids in the obtaining of consistent results with a test by maintaining constant parameters. Furthermore, the utilization of this invention also provides for taking advantage of the nonabsorbent, crushable nature of certain plastics in order to utilize them for an anchoring of a molded form to a container.

Accordingly, it is a primary object of this invention to provide a plastic form with ion-exchange elements and/or chemical ingredients.

It is another object of this invention to provide an expandable plastic form containing ion-exchange material or active particles of chemical substances which may be molded by heat, pressure of other chemical means.

It is still another object of this invention to provide an expandable plastic containing ion-exchange material or chemical particles which are mixed in a fixed proportion in order to provide a predetermined percentage of the material in proportion to the plastic at the surface or within the confines of the molded form.

It is a further object of this invention to provide a non-absorbent, crushable plastic form which may be anchored to a container by virtue of its resiliency when forced immersion is used to increase the surface area of presentment of the form to a quantity of fluid within the container.

It is a still further object of this invention to provide a form and container combination which is capable of increasing chemical and ion-exchange interaction by extending the surface area of reaction interfaces by eliminating the concentration of ion-exchange resins at a discrete point within a chemical solution to be tested.

Another object of this invention is to provide an apparatus which expedites the medical testing procedures with the elimination of errors and contamination.

Still another object of this invention involves the provision of precalibrated forms used in the testing procedures wherein the forms contain specified amounts of desired chemical substances as part thereof.

A further object of this invention involves the provision of a novel plastic form which may be easily and economically produced of conventional, currently available materials that lend themselves to standard mass production manufacturing techniques.

These and other advantages, features and objects of the invention will become more apparent from the following description taken in connection with the illustrative embodiments in the accompanying drawings, wherein:

FIGURES 1 and 2 are components partly in section which together comprise one embodiment of the form of this invention;

FIGURE 3 is a view partly in cross section of the form comprising the elements of FIGURES 1 and 2 in conjunction with a container and a cap or cover;

FIGURE 4 is an enlarged view of the plastic and interchange material illustrating their relationship when used with the forms of this invention; and FIGURE 5 is an alternative embodiment, partly in cross section, of the form in conjunction with a container.

When the form of this invention is utilized in a testing procedure, the form is shaped in order that it may be applied to a conventional container such as a test tube. The form 10 in one embodiment, basically comprises two parts which are assembled. In FIGURE 1, there is shown the cylindrical, molded polystyrene form element 12 which has a hole 14 along the central longitudinal axis thereof. The molded polystyrene form element or portion 12, if enlarged, would appear as illustrated in FIGURE 4 wherein the beads of plastic 16 have an ion-exchange resin or an active chemical 18 at the interstices between adjacent beads.

A plastic shaft 20 (FIGURE 2) has a button shaped end stop 22 at one end thereof and a spacer washer 24 proximate to the other end to form the insert on which the cylindrical form portion 12 is applied. The button shaped end stop 22 may be made integral with the shaft 20 or may be separately manufactured and applied to the end of the shaft. The washer 24 also may be molded as a part of the plastic shaft or, alternatively, may merely be press fitted onto the shaft portion 20 to abut against the cylindrical form portion 12, as illustrated in FIGURE 3. The end of the plastic shaft 20 above the spacer washer is designated with the numeral 26 and may comprise the support for an end cap or stopper element 28.

In use the device 10 appears as shown in FIGURE 3 with the cylindrical portion 12 held between the end stop 22 and the washer 24. The container is illustrated as a conventional test tube 30, and the bottom of the test tube and the shape of the end stop button 22 are the same such that any fluid in the test tube 30 would be forced above the button to occupy the space between the cylindrical form portion 10 and the sides of the test tube 30. When an initial level, as indicated at A—A of FIGURE 3, is provided in the test tube 30, the insertion of the form would produce a change in level to that indicated at B—B in said figure. The end portion 26 of the shaft 20 of the form 10 may have a cap or stopper 28 applied thereto which is arranged with tapered sides and a degree of flexibility in order to seal the test tube 30.

An alternative embodiment of the combination of form and test tube is illustrated in FIGURE 5. Here, the spacing between the inner walls of the test tube and the form 10′ is shown to be equal even at the bottom thereof; however, the bottommost portion of the expanded plastic 12′ which comprises the form 10′ may be made to abut the bottom of the test tube in a manner similar to the stop 22. In this embodiment, the expanded plastic 12′ does not have a support member or shaft as illustrated at 20 in FIGURE 2. Furthermore, the stopper or cap portion 28′ takes the place of both the washer 24 and the cap 28 in that it forms the only sealing means for the combination. This device is much simpler to manufacture in that the entire form unit 10′ is produced with a single molding step without further assembling. The plastic of this embodiment could also apppear with a chemical substance or an ion-exchange resin as illustrated enlarged in FIGURE 4.

The previously described devices may be tagged with ions of either a stable or a radioisotopic nature; however, when the base plastics 16 can be active or be activated for ion-exchange uses, separate ion-exchange resins are not required to be added. The tagging operation may be performed either before or during the molding operation.

The material utilized to manufacture the portions 12 and 12′ of plastic forms 10 and 10′ may be of any expandable plastic such as styrene or polystyrene which is moldable and mutually cohesive, or, if desired, liquefied or molten plastic may be provided as a substitute. An example would be styrene or Celluloid which is liquefied with acetone. The particular mode for manufacturing the particular shape could be by any conventional manufacturing operation commensurate with the particular plastic chosen, for example, by utilization of heat, pressure or by chemical means.

Although the invention contemplates the mixing of ion-exchange resins or chemical substances or active particles 18 with the plastic 16 prior to molding, the mixing operation may be omitted on occasions where the plastic 16, itself, might be activated for ion-exchange use. This is particularly true of styrene and polystyrene.

When the unit of a form 10′ and test tube 30′ are utilized in a medical testing technique known generally as a T–3 red cell uptake test, the following procedure may be followed to produce the form and produce the desired testing results.

One-thousand parts of expandable polystyrene bead crystals were mixed with one part of an ion-exchange resin. The entire mixture was molded into a test tube sized plug or form in the manner illustrated in FIGURE 5.

The structure comprising the form with an ion-exchange resin would, when immersed into a solution having ions freely available, allow for an interchange of ions between the solution and the ion-exchange resins at the solution form interfaces. In the T–3 blood testing procedure a small quantity of solution is placed in the test tube 30′. Since the test tube is only slightly larger in diameter than the molded form, the solution is caused to rise in proportion to the depth of form inserted into the solution by the forced immersion of the form, thereby expanding the area of interface.

When the form has the proportions of 0.100 gram of a suitable ion-exchange resin at its interstices and the interface of the solution and form, and where there has been a tagging with radioiodinated triiodothyronine in the amount of approximately 0.005 microgram, forced immersion of the form in two milliliters of human blood serum would comprise the basic step of the T–3 testing procedure. After two hours a comparison of the molded form from the serum to be tested and one which was placed in pooled human blood serum aliquots of like size is made. If the pooled serum sample assay represents 100%, then, the dissociation index for T–3–I in non-pooled serum samples forms a ratio between its assay and those of the serum samples which are pooled. A high percentage index indicates hypothyroidism, while a low percentage index indicates hyperthyroidism. Of course, a moderate percentage index would indicate normalcy.

The foregoing nonabsorbent testing procedure eliminates the uses of sponges and aspirators currently used in the absorbent sponge type of test presently utilized. A saving in time and manpower by a factor of approximately 4 is effected. Errors are reduced by virtue of the fact that no mixing is required and the forms may be manufactured to be precalibrated with specific amounts of the ion-exchange resin for presentation to the solution.

Thus, it can be seen that a plastic form and container combination has been devised with a predetermined proportion of a substance at the interstices of the plastic in order to control accurately the relationship between a material to be placed in contact with the form and the substance. Since the relative size between the container and the form allow for only a small volumetric difference the surface area presented to the material is markedly increased.

Although the invention has been described with reference to particular embodiments, it will be understood to those skilled in the art that the invention is capable of a variety of alternative embodiments within the spirit and scope of the appended claims.

I claim:

1. In combination, a form and a container for liquid, said form being of non-absorbent plastic material of the same general shape as said container and of a size slightly less than that of the said container, the difference in size being such that a small amount of liquid in said container would be displaced around said form to provide a large surface area of the liquid-form interface, and a material on the surface of said form, said material being capable of interacting with a liquid in said container.

2. A combination as defined in claim 1 wherein said form is comprised of an expandable plastic and said material comprises an ion-exchange resin.

3. A combination as defined in claim 1 wherein said container is of test-tube shape and said form is bulbous at one end to fit exactly the bottom of said test-tube shape.

4. A combination as defined in claim 1 wherein said form comprises a shaft, a button-shaped end on said shaft, a spacer washer on said shaft remote from said end, and a molded plastic between said end and said washer.

5. A combination as defined in claim 1 wherein said form has means on one end forming a closure for said container.

References Cited
UNITED STATES PATENTS 2,587,221  2/1952  Richardson et al. _____ 23—230
3,206,602  9/1965  Eberle _____ 250—71.5

JOSEPH SCOVRONEK, Primary Examiner

U.S. Cl. X.R.

23—252, 259, 292; 210—024, 359; 250—83